US011892870B2

(12) United States Patent
Shachar et al.

(10) Patent No.: US 11,892,870 B2
(45) Date of Patent: Feb. 6, 2024

(54) DETECTION AND MITIGATION OF ELECTROMAGNETIC SIGNAL ATTACKS

(71) Applicant: Dell Products L.P., Round Rock, TX (US)

(72) Inventors: Tomer Shachar, Beer-Sheva (IL); Yevgeni Gehtman, Modi'in (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 35 days.

(21) Appl. No.: 17/861,806

(22) Filed: Jul. 11, 2022

(65) Prior Publication Data

US 2024/0012441 A1 Jan. 11, 2024

(51) Int. Cl.
*G06F 1/08* (2006.01)
(52) U.S. Cl.
CPC ........................................ *G06F 1/08* (2013.01)
(58) Field of Classification Search
CPC ........................................................ G06F 1/08
See application file for complete search history.

(56) References Cited

U.S. PATENT DOCUMENTS

2017/0126279 A1* 5/2017 Jung .................... H04B 5/0031
2022/0029780 A1* 1/2022 Dafali ................. H04L 63/1466

OTHER PUBLICATIONS

Debayan Das et al., "Electromagnetic and Power Side-Channel Analysis: Advanced Attacks and Low-Overhead Generic Countermeasurements Through White-Box Approach," Cryptography, Published: Oct. 31, 2020. https://www.mdpi.com/2410-387X/4/4/30.
Alex Zhang, "What Is a Side-Channel Attack and What Countermeasures Exist?" Tech Blog, Radio Frequency (RF) Shielding, Enconnex, Mar. 31, 2022. https://blog.enconnex.com/what-is-a-side-channel-attack-vulnerabilities-and-countermeasures.

* cited by examiner

*Primary Examiner* — Stefan Stoynov
(74) *Attorney, Agent, or Firm* — Ryan, Mason & Lewis, LLP

(57) ABSTRACT

Techniques are provided for detecting and mitigating electromagnetic signal attacks. One method comprises monitoring a processing environment having an electrical component for a signal having one or more signal characteristics that satisfy one or more signal criteria, wherein the one or more signal criteria are determined based on one or more wave characteristics of one or more electromagnetic waves emitted by operation of the electrical component; and automatically adjusting an operating frequency and/or an operating phase of the electrical component in response to detecting the signal having the one or more signal characteristics that satisfy the one or more signal criteria. The automatically adjusting may be performed by a basic input/output system. The electrical component may comprise a processor and the automatically adjusting may activate an overclocking feature of the processor.

20 Claims, 9 Drawing Sheets

DETECTION AND MITIGATION OF ELECTROMAGNETIC SIGNAL ATTACKS

FIELD

The field relates generally to information processing systems, and more particularly to the protection of such information processing systems.

BACKGROUND

A side-channel attack is one form of an electromagnetic signal attack whereby protected information is extracted from a transmitted signal by measuring and analyzing electromagnetic emissions of a device. An electromagnetic signal attack may also be employed to disable a given device, or a portion thereof, by targeting the given device with one or more electromagnetic signals having specific signal characteristics.

A need remains for techniques for detecting and mitigating such electromagnetic signal attacks.

SUMMARY

In one embodiment, a method comprises monitoring a processing environment having at least one electrical component for a signal having one or more signal characteristics that satisfy one or more signal criteria, wherein the one or more signal criteria are determined based at least in part on one or more wave characteristics of one or more electromagnetic waves emitted by operation of the at least one electrical component; and automatically adjusting one or more of an operating frequency and an operating phase of the at least one electrical component in response to detecting the signal having the one or more signal characteristics that satisfy the one or more signal criteria.

In some embodiments, the processing environment may comprise a plurality of electrical components and the monitoring may comprise monitoring for one or more signals having the one or more signal characteristics that satisfy the one or more signal criteria determined based at least in part on one or more wave characteristics of one or more electromagnetic waves emitted by operation of one or more of the plurality of electrical components.

In one or more embodiments, the automatically adjusting is performed by a basic input/output system. The at least one electrical component may comprise a processor and the automatically adjusting may activate an overclocking feature of the processor.

Other illustrative embodiments include, without limitation, apparatus, systems, methods and computer program products comprising processor-readable storage media.

DETAILED DESCRIPTION

Figure 1:
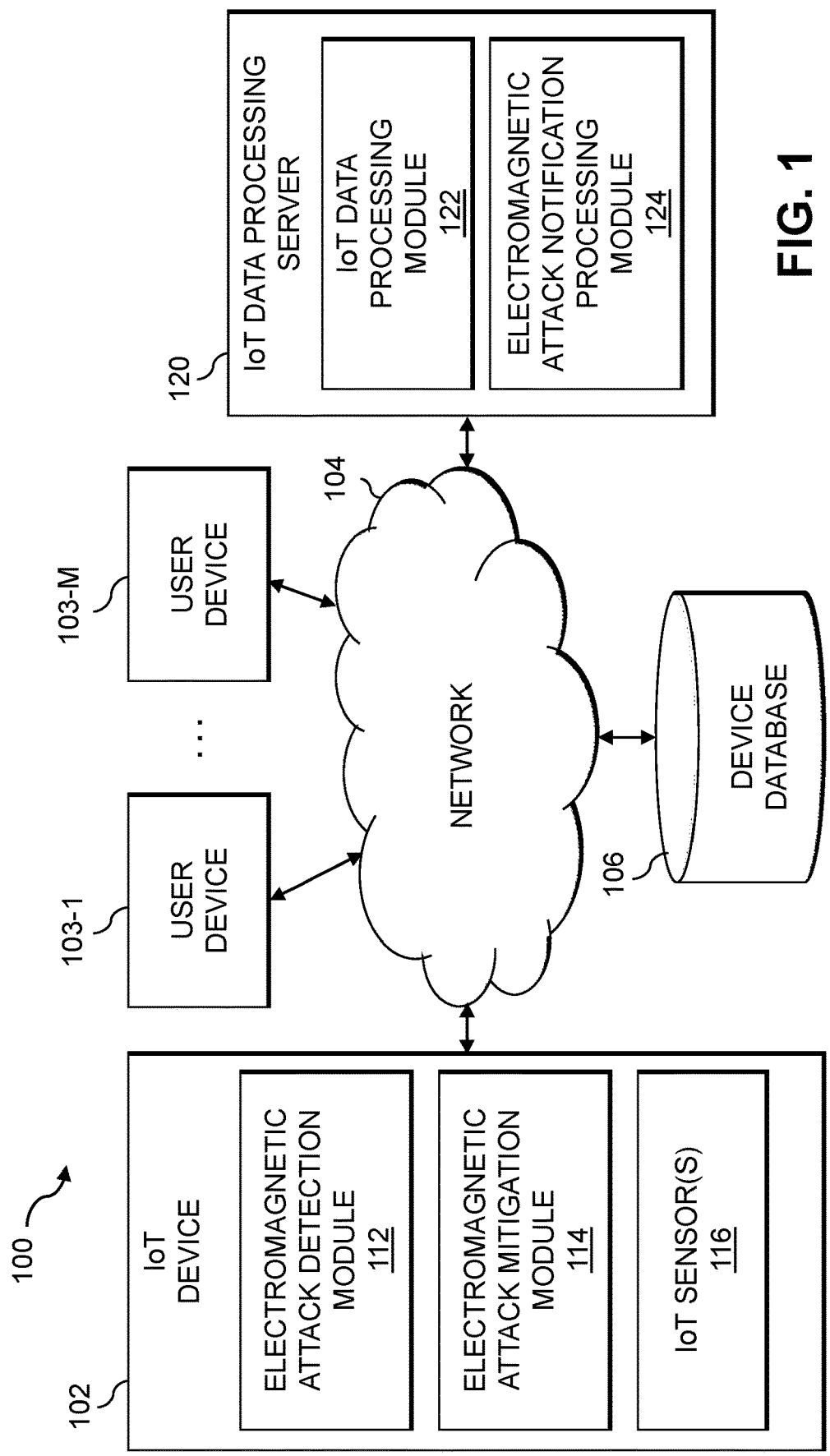
FIG. 1 illustrates an information processing system configured to detect and mitigate electromagnetic signal attacks in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for detecting and mitigating electromagnetic signal attacks.

As noted above, an electromagnetic signal attack may be employed to disable a given device, or a portion thereof, by targeting the given device with one or more electromagnetic signals having specific signal characteristics. In some embodiments, the given device may monitor itself for an electromagnetic signal attack, for example, using an antenna and a detector of the given device, as discussed further below in conjunction with FIG. 5A. In other embodiments, a separate device may be employed to monitor the given device and/or to protect the given device from such electromagnetic signal attacks. For example, a given device having one or more electrical components may be the target of an electromagnetic attack that uses one or more electromagnetic signals having frequency and/or phase characteristics that are based at least in part on the frequency and/or phase characteristics of one or more electromagnetic waves emitted by operation of the one or more electrical components.

For a given component that emits an electromagnetic wave having a particular frequency and phase, for example, an attacker can initiate an electromagnetic attack by sending an opposite electromagnetic wave, having substantially the same frequency and opposite phase, relative to the electromagnetic wave emitted by the given component, to target the given component. Through principles of destructive interference, the two signals that are shifted by half of a wavelength (e.g., the two signals that are out of phase) will cancel each other out, causing the given component to overheat (by creating an electromagnetic bottleneck), thereby placing the capacitors of the given component in a state of stress. A performance of a system comprising the given component significantly is reduced and ultimately the given component is disabled, potentially causing a denial-of-service (DoS). Once the capacitors of the given component reach their respective cycle counts (e.g., a measure of life expectancy of the capacitors) the capacitors will start to swell or otherwise physically alter and eventually destruct (or otherwise become non-operational). Generally, the destructive interference denies the natural ability of the given component to release energy, which increases the temperature of the given component and impacts the performance of the given component and cycle count of the capacitors within the given component.

One or more aspects of the disclosure recognize that electronic components emit electromagnetic signals. Such electromagnetic signals are defined by signal characteristics such as wavelength, frequency, amplitude and/or phase. A capacitor, for example, is a component that stores electrical energy in an electric field. Each capacitor has various electrical characteristics, such as capacitance, tolerance, voltage, temperature, and current. The electrical characteristics are specified by the vendor and impact a number of cycles of a given capacitor (where each cycle comprises charging electric energy and releasing the electric energy), which represents a unit of measure for life expectancy of the given capacitor.

Edge devices may be an attractive target for electromagnetic signal attacks and other electronic warfare attacks. Edge devices may be stored, for example, in a physical location that may not be properly secured. An attacker may be able to access a perimeter of a location of the edge device (or another adjacent or nearby location that is within range of the edge device), set-up an electromagnetic wave-interference device (that can often be accessed remotely) and transmit continuous-destructive-waves (having an opposite phase of one or more components of the edge device), causing the destructive interference effect referenced above.

FIG. 1 shows a computer network (also referred to herein as an information processing system) 100 configured in accordance with an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more IoT devices 102, one or more IoT data processing servers 120 and one or more device databases 106, discussed below. In other embodiments, one or more of the IoT devices 102, or portions thereof, may alternatively be implemented as other devices, such as edge devices.

The user devices 103 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." The user devices 103 may comprise a network client that includes networking capabilities such as ethernet, Wi-Fi, etc. When the user devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary IoT device 102 may comprise an electromagnetic attack detection module 112, an electromagnetic attack mitigation module 114 and one or more IoT sensors 116. In some embodiments, the electromagnetic attack detection module 112 automatically detects an electromagnetic attack, as discussed further below in conjunction with FIGS. 4A through 4D and 5A. The electromagnetic attack mitigation module 114 automatically mitigates a detected electromagnetic attack, as discussed further below in conjunction with FIG. 5B. The IoT sensors 116 may sense one or more parameters associated with IoT device 102. For example, the IoT sensors 116 may comprise hygrometers and/or thermometers that measure humidity and/or temperature, respectively. In other embodiments, the IoT sensors 116 may comprise other devices that detect and/or respond to changes in an environment.

In an embodiment where a given IoT device 102 has connectivity with a server, such as the IoT data processing server 120, the collected IoT data and/or alert notifications (e.g., DoS attack alerts) generated by the given IoT device 102 may be transmitted to the server for further processing. In this manner, the data collected by the one or more IoT sensors 116 of the IoT device 102 can be sent by the IoT device 102 over the network 104 to another device (e.g., a cloud device or a local server) for further processing and analysis.

It is to be appreciated that this particular arrangement of elements 112, 114, 116 illustrated in the IoT device 102 of the FIG. 1 embodiment is presented by way of example only, and alternative arrangements can be used in other embodiments. For example, the functionality associated with elements 112, 114, 116 in other embodiments can be combined into a single element, or separated across a larger number of elements. As another example, multiple distinct processors can be used to implement different ones of modules 112 and 114 or portions thereof.

At least portions of elements 112, 114, 116 may be implemented at least in part in the form of software that is stored in memory and executed by a processor. An exemplary process utilizing elements 112, 114, 116 of an example IoT device 102 in computer network 100 will be described in more detail with reference to FIGS. 4A through 4D, 5A, 5B and 6.

Other IoT devices 102 (not shown in FIG. 1) are assumed to be configured in a manner similar to that shown for IoT device 102 in the figure.

The IoT data processing server 120 may be implemented, for example, on the cloud or on the premises of an enterprise or another entity. In some embodiments, the IoT data processing server 120, or portions thereof, may be implemented as part of a storage system or on a host device. As also depicted in FIG. 1, the IoT data processing server 120 further comprises an IoT data processing module 122 and an electromagnetic attack notification processing module 124. In some embodiments, the IoT data processing module 122 processes IoT data received from, for example, IoT sensors 116 of one or more IoT devices 102. The electromagnetic attack notification processing module 124 may process one or more alert notifications generated, for example, by the electromagnetic attack mitigation module 114 of one or more IoT devices 102, such as DoS attack notifications.

It is to be appreciated that this particular arrangement of modules 122 and 124 illustrated in the IoT data processing server 120 of the FIG. 1 embodiment is presented by way of example only, and alternative arrangements can be used in other embodiments. For example, the functionality associated with modules 122 and 124 in other embodiments can be combined into a single module, or separated across a larger number of modules. As another example, multiple distinct processors can be used to implement different ones of modules 122 and 124 or portions thereof.

At least portions of modules 122 and 124 may be implemented at least in part in the form of software that is stored in memory and executed by a processor. An exemplary process utilizing modules 122 and 124 of an example IoT data processing server 120 in computer network 100 will be described in more detail with reference to the flow diagrams of, for example, FIGS. 4A through 4D, 5A, 5B and 6.

Additionally, the IoT data processing server 120 can have an associated device database 106 configured to store, for example, information related to various monitored devices, such as IoT device 102, such as device locations, network address assignments and performance data to be generated from the collected IoT sensor data.

The device database 106 in the present embodiment is implemented using one or more storage systems associated with the IoT data processing server 120. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more IoT devices 102, user devices 103 and the IoT data processing server 120 may be implemented on a common processing platform, or on separate processing platforms. The one or more IoT devices 102 and user devices 103 are configured to interact over the network 104 in at least some embodiments with the IoT data processing server 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the user devices 103 and/or the IoT data processing server 120 can be one or more input-output devices (not shown), which illustratively comprise keyboards, displays or other types of input-output devices in any combination. Such input-output devices can be used, for example, to support one or more user interfaces to the IoT data processing server 120, as well as to support communication between the IoT data processing server 120 and other related systems and devices not explicitly shown.

The one or more IoT devices 102, user devices 103 and the IoT data processing server 120 in the FIG. 1 embodiment are assumed to be implemented using at least one processing device. Each such processing device generally comprises at least one processor and an associated memory, and implements one or more functional modules for controlling certain features of the IoT data processing server 120.

More particularly, the one or more IoT devices 102, user devices 103 and IoT data processing server 120 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more IoT devices 102, the user devices 103 and/or the IoT data processing server 120 to communicate in some embodiments over the network 104 with each other (as well as one or more other networked devices), and illustratively comprises one or more conventional transceivers.

It is to be understood that the particular set of elements shown in FIG. 1 for detecting and mitigating electromagnetic signal attacks is presented by way of illustrative example only, and in other embodiments additional or alternative elements may be used. Thus, another embodiment includes additional or alternative systems, devices and other network entities, as well as different arrangements of modules and other components.

Figure 2:
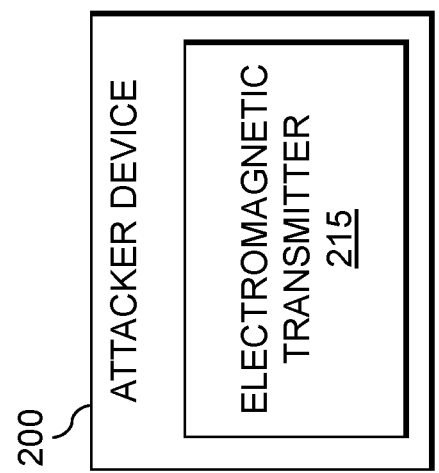
FIG. 2 illustrates an attacker device in accordance with an illustrative embodiment.

FIG. 2 illustrates an attacker device 200 in accordance with an illustrative embodiment. In the example of FIG. 2, the attacker device 200 comprises an electromagnetic transmitter 215 that may be employed to generate one or more radio waves. The electromagnetic transmitter 215 may comprise, for example, an antenna that generates the one or more radio waves. A voltage at the desired frequency of the one or more radio waves may be applied to the antenna, and the voltage across the antenna elements and the current through the antenna elements create electric and magnetic waves, respectively.

Figure 3:
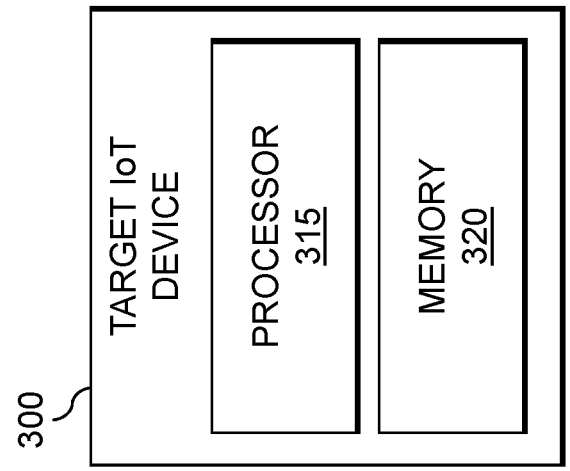
FIG. 3 illustrates a target IoT device in accordance with an illustrative embodiment.

FIG. 3 illustrates a target IoT device 300 in accordance with an illustrative embodiment. In the example of FIG. 3, the target IoT device 300 comprises a processor 315 coupled to a memory 320, such as a RAM. The processor 315 may comprise a microprocessor, a microcontroller, an ASIC, an FPGA or other type of processing circuitry, as well as portions or combinations of such circuitry elements, and the memory 320, which may be viewed as an example of a "processor-readable storage media" storing executable program code of one or more software programs.

While one or more embodiments described herein employ IoT devices as the target of an electromagnetic attack, the disclosed techniques for detecting and mitigating electromagnetic signal attacks may be employed in any device comprising at least one electrical component, where an operation of the at least one electrical component emits one or more electromagnetic waves, as would be apparent to a person of ordinary skill in the art. For example, the disclosed techniques for detecting and mitigating electromagnetic signal attacks may be employed in one or more of the user devices 103.

FIGS. 4A through 4D illustrate a number of exemplary phases 400-A through 400-D of an attack based on an electromagnetic wave 410 generated by the electromagnetic transmitter 215 of the attacker device 200 of FIG. 2 against the processor 315 of the target IoT device 300 of FIG. 3, according to one or more embodiments.

Figure 4A:
FIGS. 4A through 4D illustrate a number of exemplary phases of an attack based on an electromagnetic signal generated by a transmitter of the attacker device of FIG. 2 against a processor of the target IoT device of FIG. 3, according to one or more embodiments.

FIG. 4A illustrates a first phase 400-A of an electromagnetic attack, where the processor 315 of the target IoT device 300 of FIG. 3 emits an electromagnetic wave 420 based on the normal operating frequency of the processor 315. In addition, the attacker electromagnetic transmitter 215 of FIG. 2 initiates the electromagnetic attack by sending an opposite electromagnetic wave 410 having a substantially same frequency and a substantially opposite phase (e.g., 180 degrees out of phase) with respect to the electromagnetic wave 420. Signal intelligence techniques may be employed to determine an appropriate frequency and phase of the opposite electromagnetic wave 410 to attack a given target component of a device. A tolerance applicable to the substantially same frequency and/or the substantially opposite phase may be determined, for example, based at least in part on one or more electrical specifications of the processor 315 (or another component).

Figure 4B:
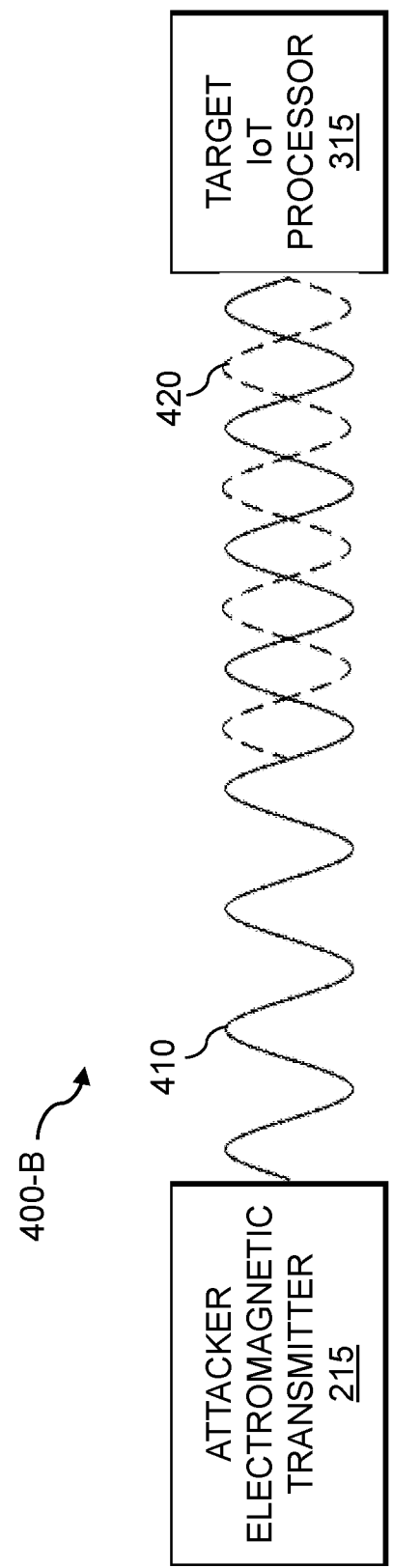
Figure 4C:
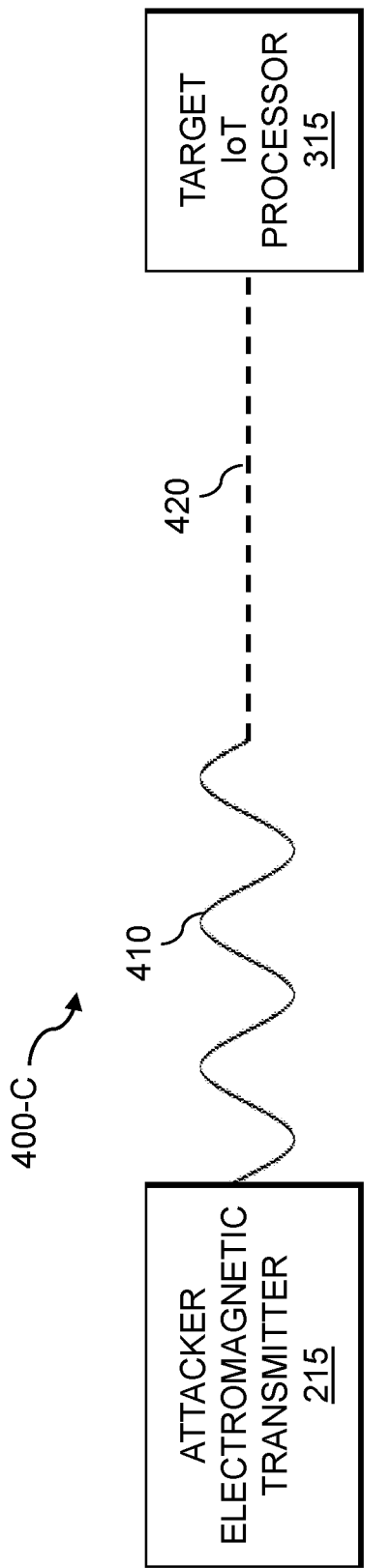

FIG. 4B illustrates a second phase 400-B of the electromagnetic attack, where the opposite electromagnetic wave 410 sent by the attacker electromagnetic transmitter 215 begins to merge with the electromagnetic wave 420 of the processor 315. FIG. 4C illustrates a third phase 400-C of the electromagnetic attack, where the electromagnetic wave 420 of the processor 315 starts to be blocked by the opposite electromagnetic wave 410 sent by the attacker electromagnetic transmitter 215, and the electromagnetic wave 420 becomes substantially close to a magnitude of zero due to destructive interference (e.g., when the amplitude and power of the electromagnetic waves 410 and 420 are substantially the same, the energy of the waves is flattened). The attacker electromagnetic transmitter 215 may increase the power of the opposite electromagnetic wave 410 until the capacitors of the processor 315 fail or the processor 315 otherwise fails.

Figure 4D:
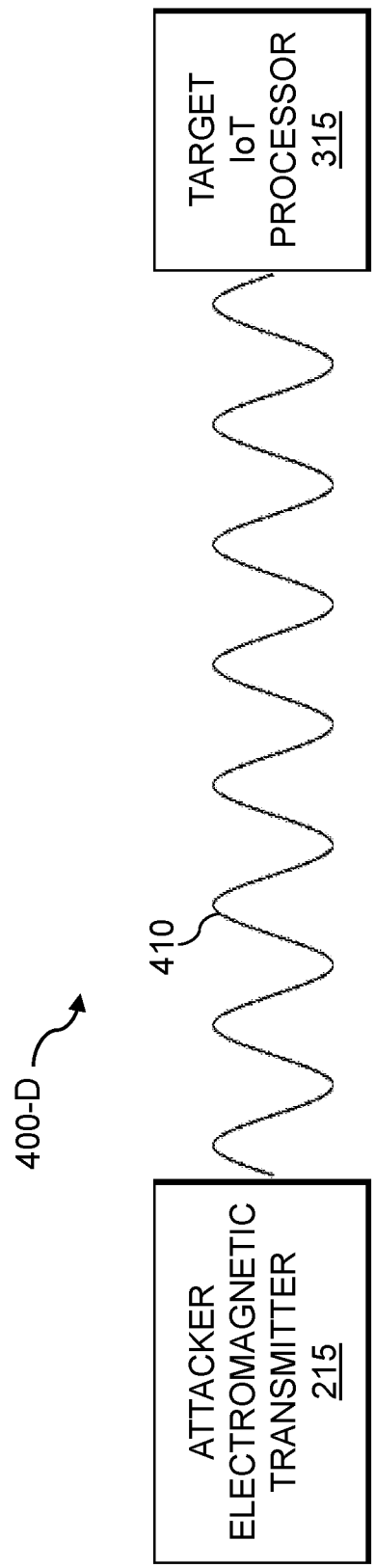

FIG. 4D illustrates a fourth phase 400-D of the electromagnetic attack, where the opposite electromagnetic wave 410 sent by the attacker electromagnetic transmitter 215 is stronger than the electromagnetic wave 420 of the processor 315, and the electromagnetic wave 420 of the processor 315 is blocked and the processor 315 becomes overloaded and cannot operate. In at least some embodiments, if the power of the attacker electromagnetic transmitter 215 is greater than the power of the processor 315, the energy of the opposite electromagnetic wave 410 overtakes the electromagnetic wave 420 of the processor 315 and prevents the processor 315 from operating.

Figure 5A:
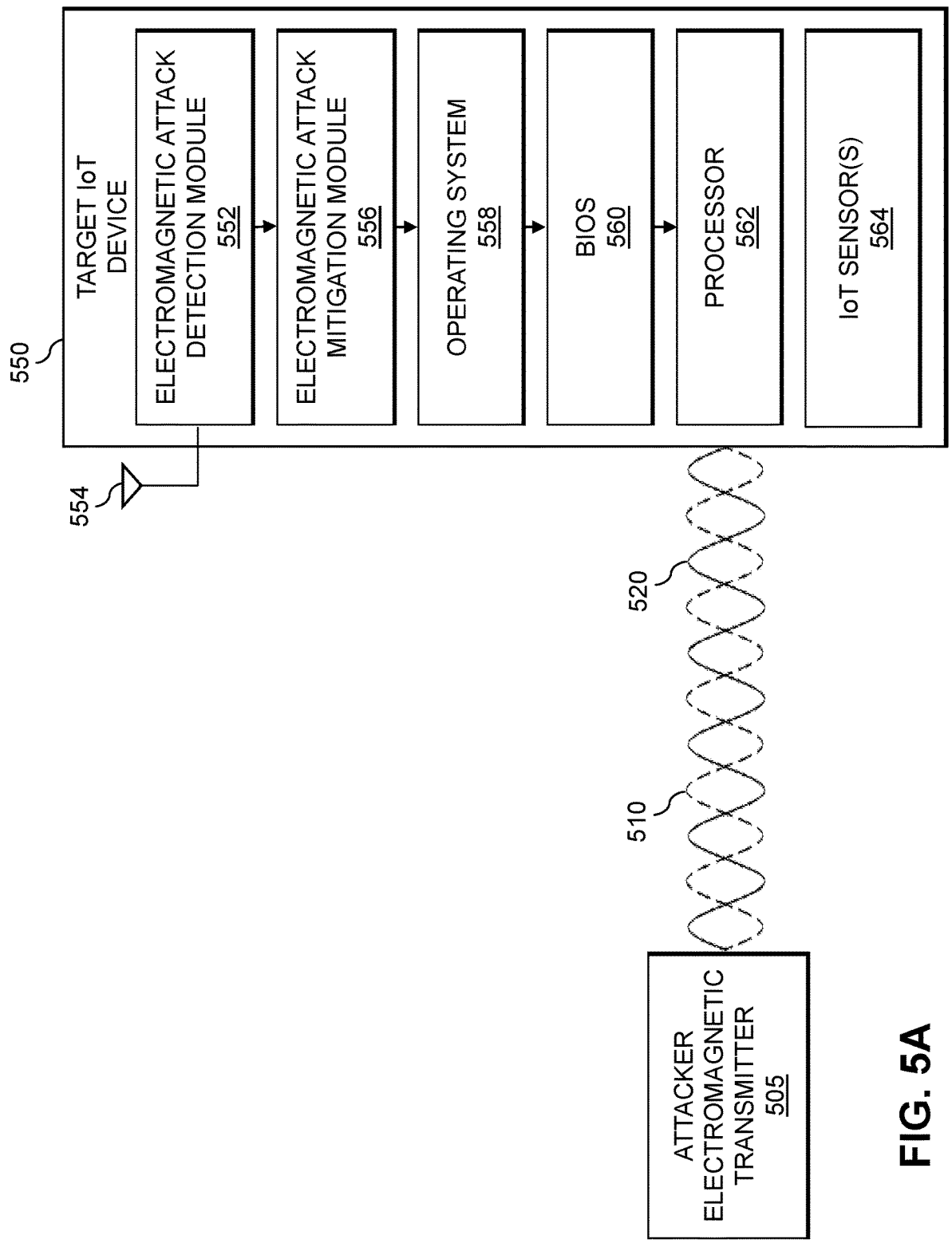
FIGS. 5A and 5B illustrate a detection and mitigation, respectively, of an electromagnetic attack against a target IoT device, according to one or more embodiments.
Figure 5B:
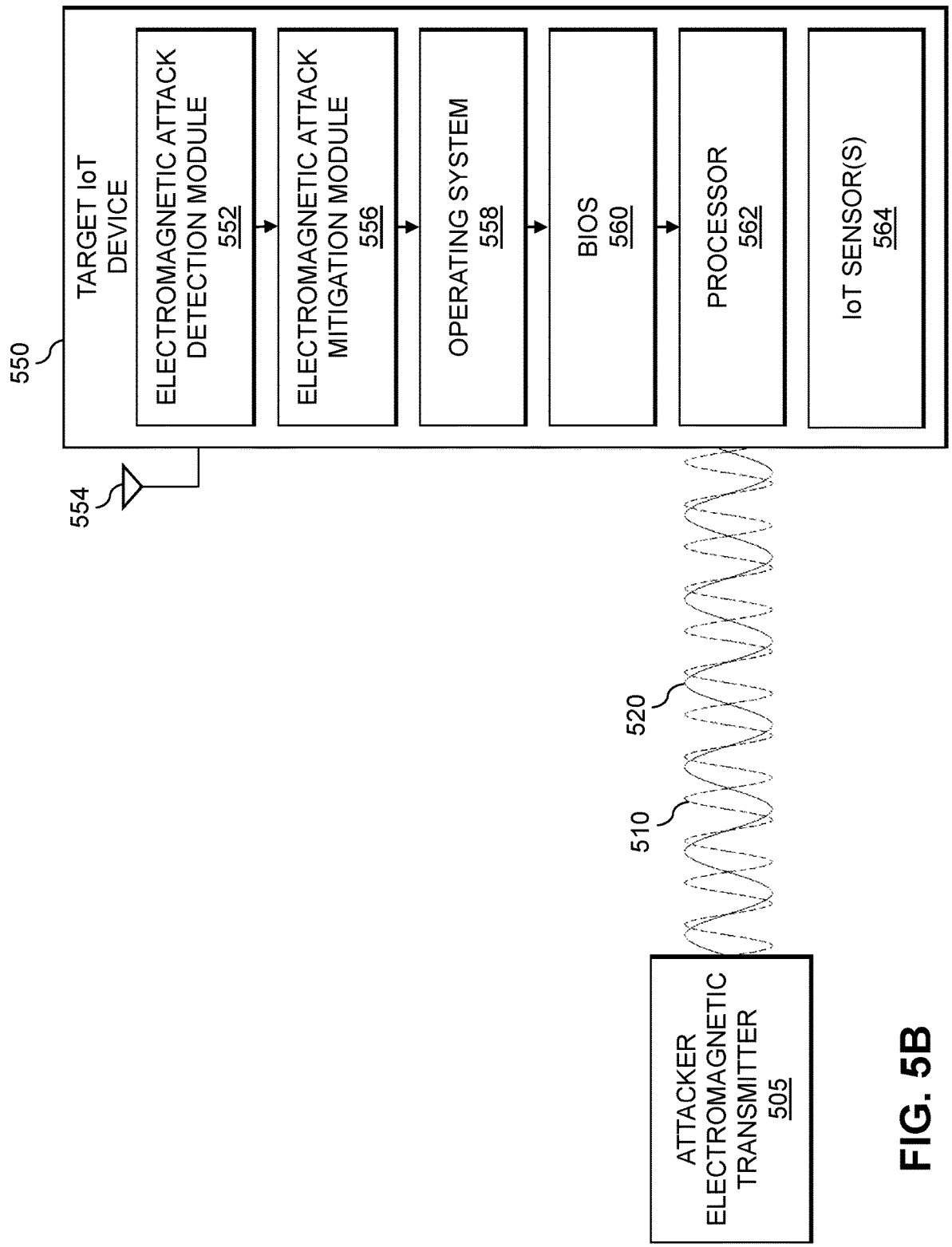

FIGS. 5A and 5B, respectively, illustrate a detection and mitigation of an electromagnetic attack by an attacker electromagnetic transmitter 505 against a target IoT device 550, according to one or more embodiments. In the example of FIG. 5A, the target IoT device 550 comprises an electromagnetic attack detection module 552 having an associated antenna 554, an electromagnetic attack mitigation module 556, an operating system 558, a basic input/output system (BIOS) 560, a processor 562 and one or more IoT sensors 564. The one or more IoT sensors 564 may sense one or more parameters associated with the target IoT device 550 and may be implemented in a similar manner as the IoT sensors 116 of FIG. 1.

In some embodiments, the electromagnetic attack detection module 552 employs the antenna 554 to automatically detect an electromagnetic attack. For example, the electromagnetic attack detection module 552 may monitor for a signal having one or more signal characteristics (e.g., a frequency and/or a phase) that satisfy one or more signal criteria (e.g., determined based on one or more wave characteristics (e.g., a frequency and/or a phase) of one or more electromagnetic waves emitted by operation of one or more components of the target IoT device 550, such as the processor 562). The one or more signal criteria used to detect an electromagnetic attack may be determined based on, for example, one or more electrical specifications of the particular component to be protected (e.g., a frequency range, a phase, a power, a number of cycles of one or more capacitators, a number of capacitors, and/or a charge time of the protected component).

In one or more embodiments, the electromagnetic attack mitigation module 556 automatically mitigates a detected electromagnetic attack, as discussed further below in conjunction with FIG. 5B. The BIOS 560 may initialize hardware during a boot process for the target IoT device 550, and may provide runtime services for the operating system 558 and programs of the target IoT device 550. The BIOS 560 may be employed in at least some embodiments to automatically adjust an operating frequency and/or an operating phase of one or more components of the target IoT device 550 to mitigate against a detected electromagnetic attack, using the physical access and privilege of the BIOS 560 to make these changes. For example, the BIOS 560 may activate an overclocking feature of the processor 562 or other "moving target" methodology to adjust the operating frequency/phase of the processor 562. For other components, the BIOS may adjust an operating frequency/phase within an operating range of a given component. In another embodiment, the BIOS 560 may briefly interrupt (e.g., pause) the operation of the processor 562 to adjust the operating phase of the processor 562.

It is to be appreciated that this particular arrangement of elements 552, 554, 556, 558, 560 and 562 illustrated in the target IoT device 550 of the FIGS. 5A and 5B embodiments are presented by way of example only, and alternative arrangements can be used in other embodiments. For example, the functionality associated with elements 552, 554, 556, 558, 560 and 562 in other embodiments can be combined into a single element, or separated across a larger number of elements. As another example, multiple distinct processors can be used to implement different ones of modules 552 and 556 or portions thereof. At least portions of elements 552, 554, 556, 558, 560 and 562 may be implemented at least in part in the form of software that is stored in memory and executed by a processor.

In the example of FIG. 5A, the processor 562 of the target IoT device 550 emits an electromagnetic wave 510 based on the normal operating frequency of the processor 562. In addition, the attacker electromagnetic transmitter 505 initiates an electromagnetic attack by sending an opposite wave 520 having a substantially same frequency and a substantially opposite phase (e.g., 180 degrees out of phase) with respect to the electromagnetic wave 510.

In the example of FIG. 5B, the electromagnetic attack detection module 552, using antenna 554, detects the opposite wave 520 associated with the initiated electromagnetic attack and notifies the electromagnetic attack mitigation module 556 of the detected attack. The electromagnetic attack mitigation module 556 then instructs the BIOS 560 to automatically adjust the operating frequency and/or phase of the target component, such as the processor 562. As noted above, the BIOS may activate an overclocking feature of the processor 562 to adjust the operating frequency of the processor 562. For example, the overclocking feature of the processor 562 may be activated to increase the operating speed (e.g., the frequency) of the processor 562, such that the processor 562 runs faster. In other embodiments, the BIOS may activate an underclocking feature of the processor 562. As a result, the electromagnetic wave 510 emitted by the processor 562 transitions to a different frequency that is more resilient to the opposite wave 520 that was sent by the attacker electromagnetic transmitter 505. As shown in FIG. 5B, the operating frequency of the processor 562 has been increased, causing the frequency of the electromagnetic wave 510 to also increase, in response to the detected electromagnetic attack. Thus, the electromagnetic wave 510 and the opposite wave 520 no longer have the same frequency and the destructive interference effect is prevented.

Figure 6:
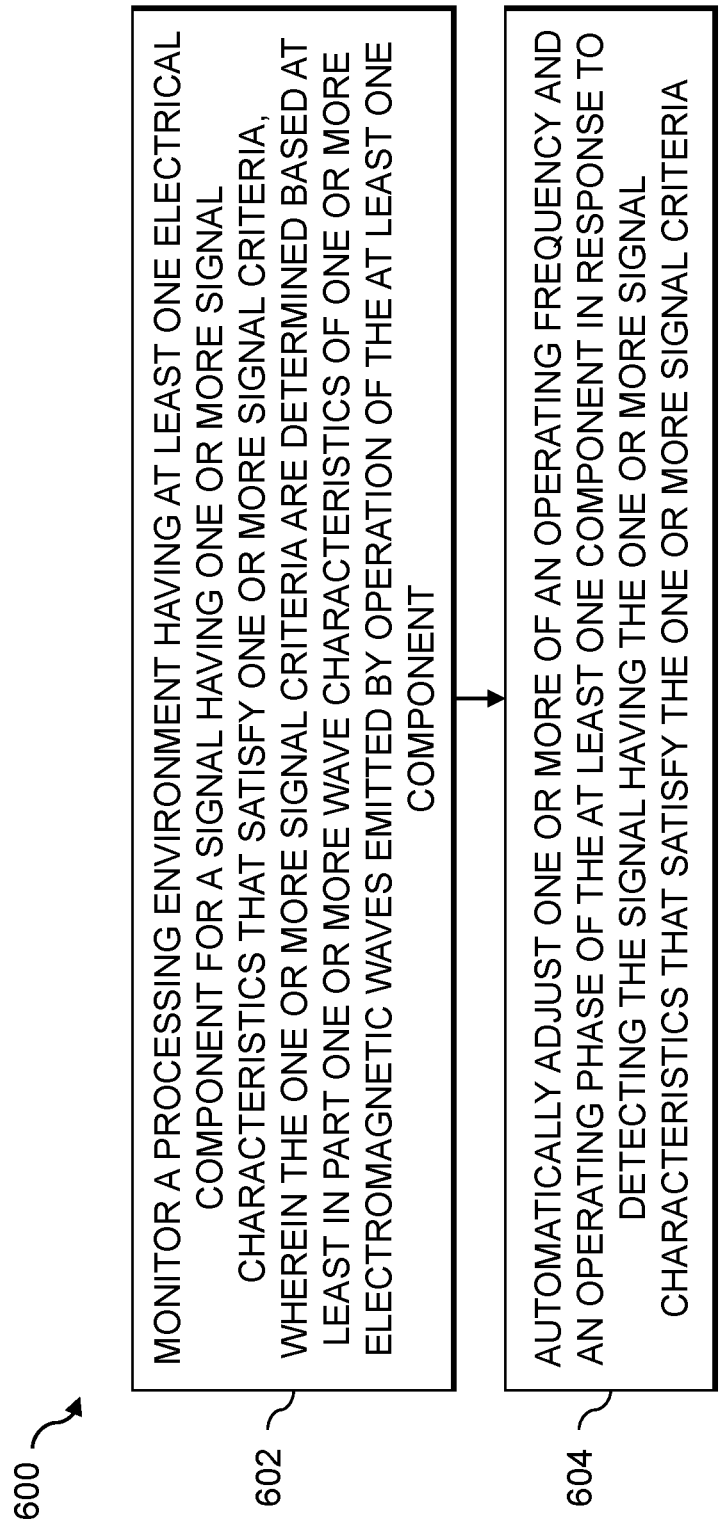
FIG. 6 is a flow chart illustrating an exemplary implementation of a process for detecting and mitigating electromagnetic signal attacks, according to one embodiment of the disclosure.

FIG. 6 is a flow chart illustrating an exemplary implementation of a process 600 for detecting and mitigating electromagnetic signal attacks, according to one embodiment of the disclosure. In step 602, the process 600 monitors a processing environment having at least one electrical component for a signal having one or more signal characteristics that satisfy one or more signal criteria, wherein the one or more signal criteria are determined based at least in part on one or more wave characteristics of one or more electromagnetic waves emitted by operation of the at least one electrical component. In step 604, the process 600 automatically adjusts one or more of an operating frequency and an operating phase of the at least one electrical component in response to detecting the signal having the one or more signal characteristics that satisfy the one or more signal criteria.

In one or more embodiments, an edge device having the at least one electrical component and/or an IoT device having the at least one electrical component may be monitored and protected. The processing environment may comprise a plurality of electrical components and the monitoring may comprise monitoring for one or more signals having the one or more signal characteristics that satisfy the one or more signal criteria determined based at least in part on one or more wave characteristics of one or more electromagnetic waves emitted by operation of one or more of the plurality of electrical components.

In some embodiments, the automatically adjusting is performed by a basic input/output system associated with the at least one electrical component. The at least one electrical component may comprise a processor and the automatically adjusting may activate an overclocking feature of the processor. The at least one electrical component can be monitored to determine the one or more wave characteristics of the one or more electromagnetic waves emitted by the operation of the at least one electrical component. In this manner, the signal criteria may be dynamically established in some embodiments. A notification may be sent in response to the detecting the signal having the one or more signal characteristics that satisfy the one or more signal criteria.

In at least one embodiment, the one or more signal criteria comprise the signal having a substantially same frequency and a substantially opposite phase relative to the frequency and the phase of the one or more electromagnetic waves emitted by the operation of the at least one electrical component.

The particular processing operations and other network functionality described in conjunction with the flow diagrams of FIG. 6, for example, are presented by way of illustrative example only, and should not be construed as limiting the scope of the disclosure in any way. Alternative embodiments can use other types of processing operations for detecting and mitigating electromagnetic signal attacks. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for detecting and mitigating electromagnetic signal attacks can be employed, for example, to monitor for electromagnetic attacks and to mitigate a detected electromagnetic attack against at least one electrical component by automatically adjusting an operating frequency and/or an operating phase of the at least one electrical component.

One or more embodiments of the disclosure provide improved methods, apparatus and computer program products for detecting and mitigating electromagnetic signal attacks. The foregoing applications and associated embodiments should be considered as illustrative only, and numerous other embodiments can be configured using the techniques disclosed herein, in a wide variety of different applications.

It should also be understood that the disclosed electromagnetic attack detection and mitigation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for detecting and mitigating electromagnetic signal attacks may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based electromagnetic attack detection and mitigation engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based electromagnetic attack detection and mitigation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
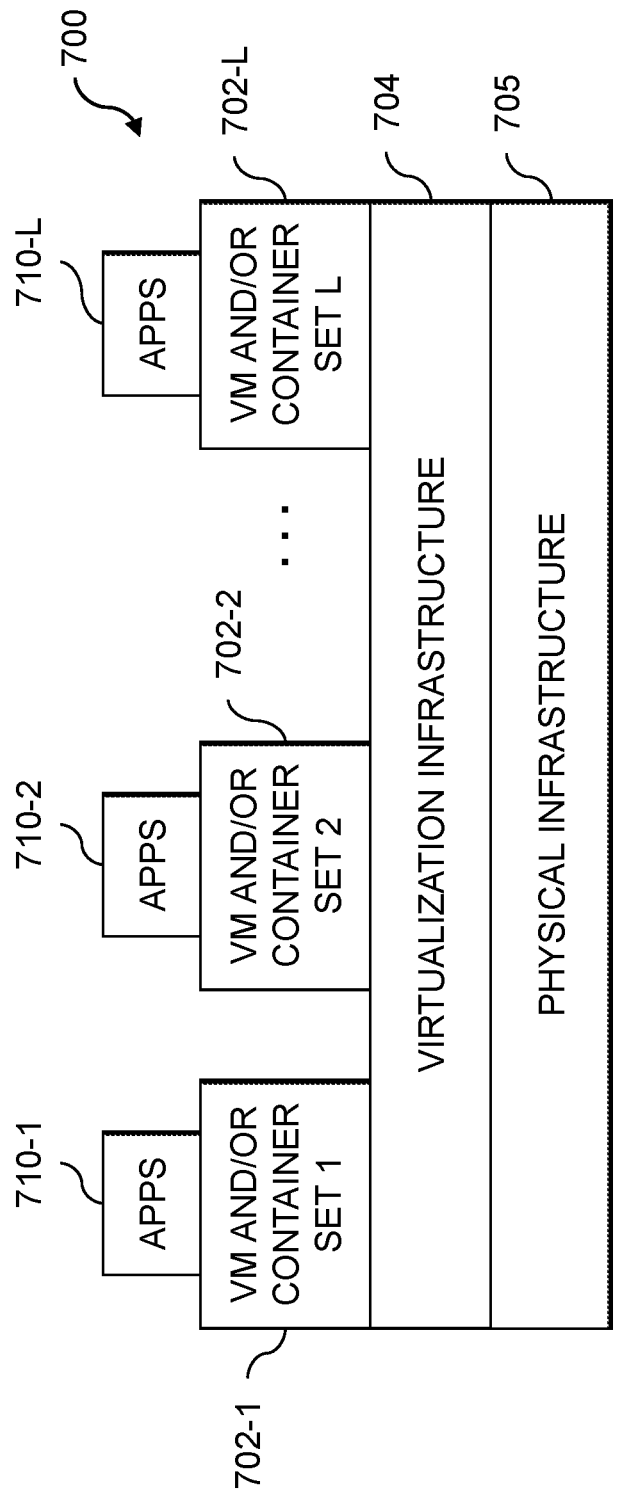
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, ... 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, ... 710-L running on respective ones of the VMs/container sets 702-1, 702-2, ... 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide electromagnetic attack detection and functionality of the type described above for one or more processes running on a given one of the VMs. For example, each of the VMs can implement electromagnetic attack detection control logic and associated mitigation functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide electromagnetic attack detection and mitigation functionality of the type described above for one or more processes running on different ones of the containers. For example, a container host device supporting multiple containers of one or more container sets can implement one or more instances of electromagnetic attack detection and mitigation control logic and associated mitigation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
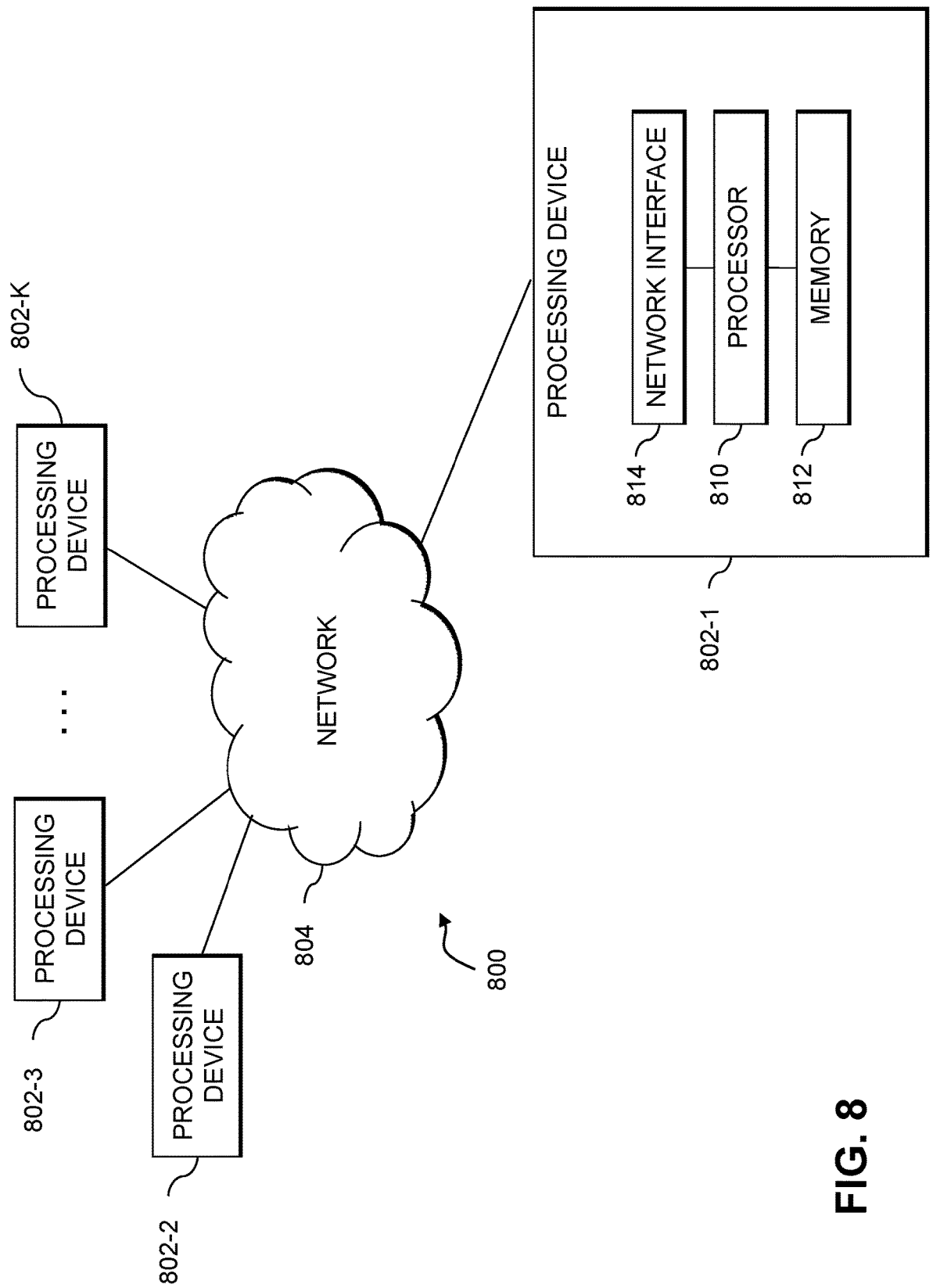
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   monitoring a processing environment having at least one electrical component for a signal having one or more signal characteristics that satisfy one or more signal criteria, wherein the one or more signal criteria are determined based at least in part on one or more wave characteristics of one or more electromagnetic waves emitted by operation of the at least one electrical component; and
   automatically adjusting one or more of an operating frequency and an operating phase of the at least one electrical component in response to detecting the signal having the one or more signal characteristics that satisfy the one or more signal criteria;
   wherein the method is performed by at least one processing device of the processing environment, wherein each such processing device comprises a processor coupled to a memory.

2. The method of claim 1, wherein a given one of the at least one processing device comprises one or more of an edge device having the at least one electrical component and an Internet of Things device having the at least one electrical component.

3. The method of claim 2, wherein the given processing device further comprises an antenna and a detector coupled to the antenna.

4. The method of claim 1, wherein the processing environment comprises a plurality of electrical components and wherein the monitoring comprises monitoring for one or more signals having the one or more signal characteristics that satisfy the one or more signal criteria determined based at least in part on one or more wave characteristics of one or more electromagnetic waves emitted by operation of one or more of the plurality of electrical components.

5. The method of claim 1, wherein a given one of the at least one processing device monitors the at least one electrical component to determine the one or more wave characteristics of the one or more electromagnetic waves emitted by the operation of the at least one electrical component.

6. The method of claim 1, wherein the automatically adjusting is performed by a basic input/output system of a given one of the at least one processing device.

7. The method of claim 1, wherein the at least one electrical component comprises a processor and wherein the automatically adjusting activates an overclocking feature of the processor.

8. The method of claim 1, further comprising sending a notification in response to the detecting the signal having the one or more signal characteristics that satisfy the one or more signal criteria.

9. The method of claim 1, wherein the one or more signal criteria comprise the signal having a substantially same frequency and a substantially opposite phase relative to a frequency and a phase of the one or more electromagnetic waves emitted by the operation of the at least one electrical component.

10. An apparatus comprising:
    at least one processing device comprising a processor coupled to a memory;
    the at least one processing device being configured to implement the following steps:
    monitoring a processing environment having at least one electrical component for a signal having one or more signal characteristics that satisfy one or more signal criteria, wherein the one or more signal criteria are determined based at least in part on one or more wave characteristics of one or more electromagnetic waves emitted by operation of the at least one electrical component; and
    automatically adjusting one or more of an operating frequency and an operating phase of the at least one electrical component in response to detecting the signal having the one or more signal characteristics that satisfy the one or more signal criteria.

11. The apparatus of claim 10, wherein the processing environment comprises a plurality of electrical components and wherein the monitoring comprises monitoring for one or more signals having the one or more signal characteristics that satisfy the one or more signal criteria determined based at least in part on one or more wave characteristics of one or more electromagnetic waves emitted by operation of one or more of the plurality of electrical components.

12. The apparatus of claim 10, wherein a given one of the at least one processing device monitors the at least one electrical component to determine the one or more wave characteristics of the one or more electromagnetic waves emitted by the operation of the at least one electrical component.

13. The apparatus of claim 10, wherein the automatically adjusting is performed by a basic input/output system of a given one of the at least one processing device.

14. The apparatus of claim 10, wherein the at least one electrical component comprises a processor and wherein the automatically adjusting activates an overclocking feature of the processor.

15. The apparatus of claim 10, further comprising sending a notification in response to the detecting the signal having the one or more signal characteristics that satisfy the one or more signal criteria.

16. A non-transitory processor-readable storage medium having stored therein program code of one or more software programs, wherein the program code when executed by at least one processing device causes the at least one processing device to perform the following steps:
    monitoring a processing environment having at least one electrical component for a signal having one or more signal characteristics that satisfy one or more signal criteria, wherein the one or more signal criteria are determined based at least in part on one or more wave characteristics of one or more electromagnetic waves emitted by operation of the at least one electrical component; and
    automatically adjusting one or more of an operating frequency and an operating phase of the at least one electrical component in response to detecting the signal having the one or more signal characteristics that satisfy the one or more signal criteria.

17. The non-transitory processor-readable storage medium of claim 16, wherein the processing environment comprises a plurality of electrical components and wherein the monitoring comprises monitoring for one or more signals having the one or more signal characteristics that satisfy the one or more signal criteria determined based at least in part on one or more wave characteristics of one or more electromagnetic waves emitted by operation of one or more of the plurality of electrical components.

18. The non-transitory processor-readable storage medium of claim 16, wherein a given one of the at least one processing device monitors the at least one electrical component to determine the one or more wave characteristics of the one or more electromagnetic waves emitted by the operation of the at least one electrical component.

19. The non-transitory processor-readable storage medium of claim 16, wherein the automatically adjusting is performed by a basic input/output system of a given one of the at least one processing device.

20. The non-transitory processor-readable storage medium of claim 16, wherein the at least one electrical component comprises a processor and wherein the automatically adjusting activates an overclocking feature of the processor.

* * * * *